US 6,714,324 B1

United States Patent
Kurosawa et al.

(10) Patent No.: US 6,714,324 B1
(45) Date of Patent: Mar. 30, 2004

(54) FILM SCANNER

(75) Inventors: Yuichi Kurosawa, Tokyo (JP);
Yasuhiro Yamamoto, Tokyo (JP);
Shuzo Seo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/557,782

(22) Filed: Apr. 26, 2000

(30) Foreign Application Priority Data

Apr. 27, 1999 (JP) .......................................... 11-119277

(51) Int. Cl.[7] ........................ G03G 15/00; G03B 27/62; H04N 1/04
(52) U.S. Cl. ........................ 358/487; 358/506; 355/75; 399/377; 399/378
(58) Field of Search ................................ 358/487, 488, 358/498, 474, 504, 505, 506; 355/75, 18; 399/377, 378, 389; 359/205

(56) References Cited

U.S. PATENT DOCUMENTS

| 5,461,414 | A |   | 10/1995 | Honda et al. ............... 347/250 |
| 5,995,204 | A | * | 11/1999 | Hoshino et al. .............. 355/75 |
| 6,100,960 | A | * | 8/2000  | Sato et al. ..................... 355/40 |
| 6,195,182 | B1 | * | 2/2001 | Kunishige .................... 358/487 |

OTHER PUBLICATIONS

"MINOLTA Dimage Scan Multi", copyright in 1998 (Japan).

* cited by examiner

Primary Examiner—Edward Coles
Assistant Examiner—Jason Sherrill
(74) Attorney, Agent, or Firm—Greenblum & Bernstein, P.L.C.

(57) ABSTRACT

A film scanner for scanning images formed on a film is provided with a film type identifying system that automatically identifies a type of a film to be scanned, and a scanning condition setting system that automatically sets a scanning condition in accordance with the type of the film identified by the film type identifying system.

20 Claims, 5 Drawing Sheets

FILM SCANNER

BACKGROUND OF THE INVENTION

The present invention relates to a film scanner for scanning images formed on a silver-salt film.

Recently, as personal computers become more widespread, image data is processed using the personal computer and recorded. It has been desired that the images formed on the silver-salt film are converted to electronic images (i.e., the image data) so as to be processed in the personal computers. For this purpose, a film scanner for capturing the images on the silver-salt films has been developed and used. With the film scanner, the optical images on the film are read and converted into the image data. Generally, the film scanner is provided with a CCD line sensor. By scanning the image in a direction (i.e., a main scanning direction) in which the CCD line sensor extends, while the film is moved relative to the CCD line sensor in a direction (i.e., an auxiliary scanning direction) perpendicular to the main scanning direction, a two-dimensional area is scanned.

In such a film scanner, it is preferable that not only 35 mm film but a various type of films having various sizes can be scanned. However, in order to scan the various size of images using a CCD having a fixed size, a magnification of an imaging lens for forming the image of a picture (i.e., an image on the film) on the CCD should be changed. For varying the magnification, a scanner in which a plurality of imaging lens having different focal lengths which can be selectively utilized, or a scanner provided with a zoom lens have been suggested.

Further to the above, for films having different sizes, aspect ratios of the images are different, and thus, moving amounts for the auxiliary scanning should be varied depending on the film size. A scanner in which the moving amount of the auxiliary scanning is varied has also been developed.

As described above, with the conventional film scanner, by setting the scanning conditions (i.e., the focal length of the imaging lens, the moving amount in the auxiliary scanning direction, etc.), different types of films can be scanned. In the conventional scanners, however, as described above, the size and type of the film to be scanned is first recognized by an operator. Then, the operator manually sets the scanning conditions for the film to be scanned.

If a plurality of films having different sizes are to be frequently replaced and scanned, the operator is required to adjust the conditions every time the films are exchanged, which is extremely troublesome. Further, if the operator fails to set the condition or set the condition for a different film, the images on the film may not be scanned correctly.

The above problem also occurs if a various type of films such as infrared film and X-ray film are to be scanned, or a various type of images such as negative images, positive images, color images having different gamma characteristics are to be scanned. In such a case, even if the size of the image is the same, the scanner should execute an image processing operation suitable for the original image. In such a case, according to the conventional scanner, the type of the image to be scanned should be recognized by the operator, and then the scanning condition should be adjusted by the operator manually.

SUMMARY OF THE INVENTION

It is therefore an object of the invention to provide an improved film scanner in which, when films to be scanned are exchanged, the scanning condition is automatically adjusted.

For the object, according to the invention, there is provided a film scanner for scanning images formed on a film, which is provided with a film type identifying system that automatically identifies a type of a film to be scanned and a scanning condition setting system that automatically sets a scanning condition in accordance with the type of film identified by the film type identifying system.

Since the film type is automatically identified, and the scanning condition is set accordingly, the scanning operation can be performed easily even if films of different types are frequently exchanged.

In particular, the film type identifying system identifies films having different sizes. In this case, the film type identifying system identifies at least 8 mm film, 16 mm film, 35 mm film and "brownie" type film. Alternatively or optionally, the film type identifying system identifies films having different gamma characteristics. In this case, the image processing operation is varied in accordance with the gamma characteristics. Further optionally or alternatively, the film type identifying system identifies at least negative film, positive film, infrared film and X-ray film. Also in this case, image processing operation may be changed in accordance with the identified film type.

Optionally, the film scanner may be provided with a line image sensor unit for scanning the film in a main scanning direction and an auxiliary scanning system that moves the film relative to the line image sensor in an auxiliary scanning direction which is perpendicular to the main scanning direction. In this case, the film type identifying system identifies films having different sizes, and the scanning condition setting system sets a focal length of an imaging lens that forms an image of the film on the line image sensor.

In such a case, the image condition setting system includes a switching mechanism that locates one of a plurality of imaging lenses corresponding to the film to be scanned. Alternatively, a zoom lens system may be employed and the focal length thereof may be varied without moving the position of the lens.

If various sizes of films are to be scanned, the scanning condition setting system sets a moving amount of the film relative to the line image sensor for scanning each frame of image in accordance with the size of the film to be scanned.

Optionally, the film identifying system identifies the films by recognizing film holders holding the films, different films being held by different film holders.

In one case, the film identifying system optically identifies the film holder. This represents an example of a non-contact detection system, and other kinds of non-contact detection systems may be employed.

In particular, the film identifying system may include a plurality of openings forming unique patterns for respective film holders, the plurality of openings being formed on the respective film holders and a detecting system that detects the pattern formed on the film holder.

It is preferable, in such a case, that an image sensor that is used for scanning the film can be used for the detecting system.

Still optionally, the film identifying system includes a code indication member provided on each of the film holders, the code indication member carrying a code indicating the film held by each film holder and a code detector that detects the code indicated by the code indication member. In a particular case, the code indication member may carry a bar code.

BRIEF DESCRIPTION OF THE ACCOMPANYING DRAWINGS

DETAILED DESCRIPTION OF THE EMBODIMENTS

Figure 1:
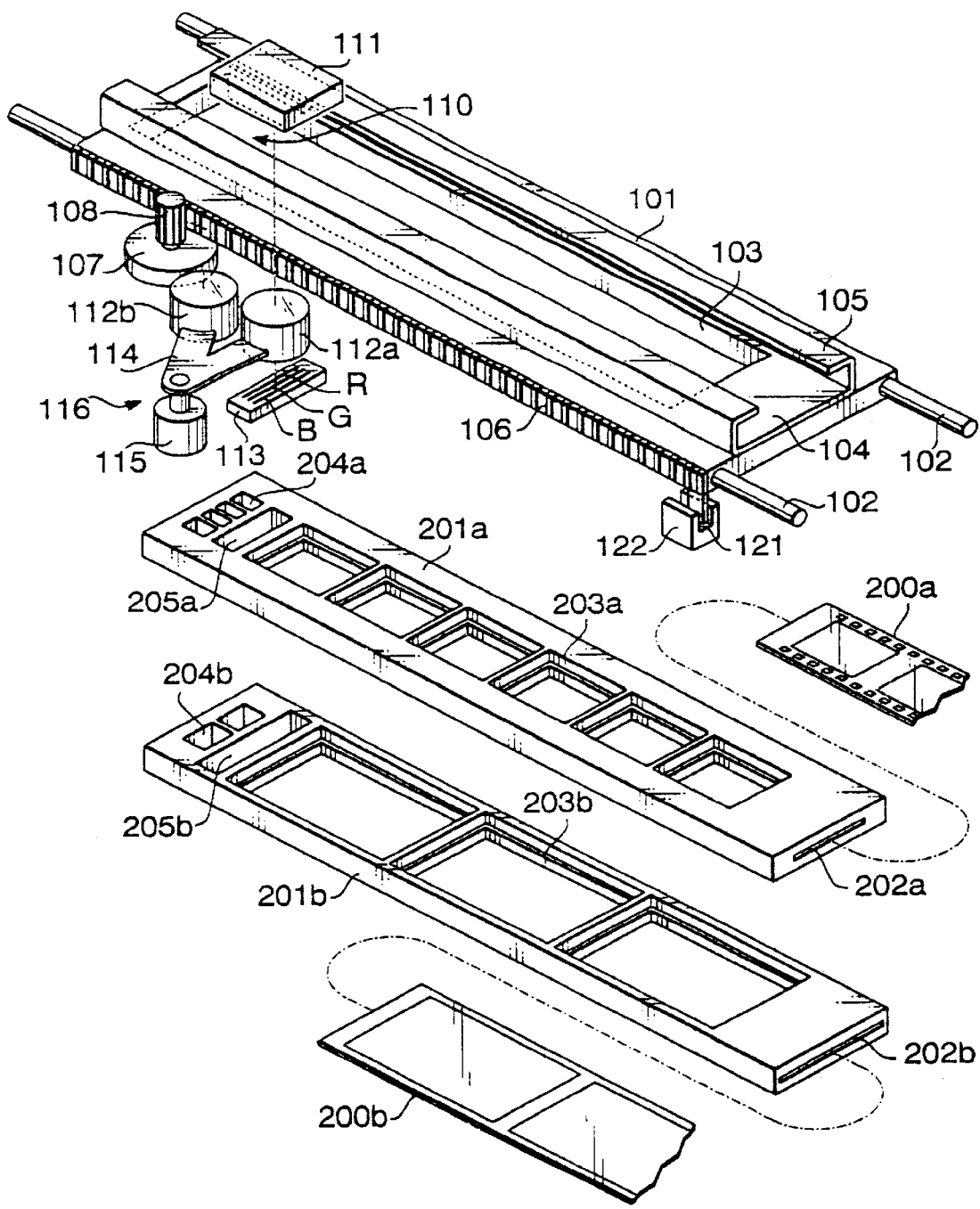
FIG. 1 is a partially exploded perspective view of a part of a film scanner according to a first embodiment of the invention.

FIG. 1 is a partially exploded perspective view of a part of a film scanner according to a first embodiment of the invention.

In the first embodiment, films whose size are different can be scanned. A film scanner according to the first embodiment has a casing (not shown) on which two guide bars 102, 102, which extend horizontally, are mounted as shown in FIG. 1. A table 101 is mounted on the guide bars 102 and 102. The table 101 is slidable along the guide bars 102 and 102.

On the table 101, either a film holder 201a or a film holder 201b is held. Different films are held by the film holders 201a and 201b, respectively. Between the guide bars 102 and 102, and at an end portion along the direction of elongation of the guide bars 102 and 102, a scanning section 110 is defined. At the scanning section 110, a diffused light source 111, imaging lenses 112a and 112b, a CCD line sensor unit 113 are provided. Specifically, the light source 111 is provided above the guide bars 102 and 102. The light emitting surface of the light source 111 is directed downward. The imaging lenses 112a and 112b are located beneath the light source 111 and at a level lower than the guide bars 102 and 102. Further beneath the light source 111, the CCD line sensor unit 113 is located. The CCD line sensor unit 113 includes three line sensors for RGB (Red, Green and Blue) components. The CCD line sensor unit 113 is placed such that the direction of elongation of the line sensors is perpendicular to the direction of elongation of the guide bars 102 and 102. It should be noted that one of the lenses 112a and 112b is selectively inserted between the light source 111 and the CCD line sensor unit 113. The light emitted by the light source 111 passes through an image on the film located at the scanning section 110. Then the light passed through the image is converged by the lens 112a or 112b on the CCD line sensor unit 113.

In this embodiment, the imaging lens 112a is used for 35 mm film, and the imaging lens 112b is used for a "brownie" type film. As described above, according to the film to be scanned, one of the imaging lenses 112a and 112b is selectively located between the light source 111 and the CCD line sensor unit 113 by a lens switching mechanism 116. Specifically, as shown in FIG. 1, the lens switching mechanism 116 has a rotary solenoid 115, and a V-shaped lever 114, the bent portion of which is secured to the rotary solenoid 115, such that the V-shaped lever 114 rotates in a horizontal direction. At the distal ends of the V-shaped lever 114, the imaging lenses 112a and 112b are fixed, respectively. With this structure, by controlling the rotational position of the lever 114, one of the imaging lenses 112a and 112b can be located between the light source 111 and the CCD line sensor unit 113.

At both side end portions of the table 101, the guide bars 102 and 102 slidably penetrate through the table 101. respectively. Thus, the table, 101 can move along the direction of elongation of the guide bars 102 and 102 while being guided thereby. At a substantially central portion of the table 101, a rectangular scanning window 103 is formed as a through opening in the thickness direction of the table 101. A portion of a film corresponding to the window 103 can be scanned. Further, as shown in FIG. 1, a rail member 105 for accepting a film holder 201a or 201b is mounted on the table 101. Both side ends of the rail member 105 are bent such that the cross sectional shape thereof are L-shaped, as shown in FIG. 1 so as to hold the film holder 201a or 201b. The central portion of the rail member 104 is formed to have an opening corresponding to the window 103 that is formed on the table 101.

On one side surface of the table 101 in its width direction, a rack 106, which extends in the longitudinal direction of the side surface, is provided integrally with the table 101. A stepping motor 107, which is used for scanning, is mounted on the casing of the scanner and located close to one of the guide bars 102 and 102. A pinion 108 secured to a spindle shaft of the motor 107 is engaged with the rack 106. At an end portion, which is farthest from the motor 107, of the side surface at which the rack 106 is provided, a light shielding plate 121 protrudes downward from the table 101. Correspondingly to the light shielding plate 121, a light transmission type photo interrupter 122 is provided. In this embodiment, the light shielding plate 121 is located at the photo interrupter 122 so as to shield the light when a film identifying openings 204a or 204b are located at the scanning section 110.

In this embodiment, the film holder 201a holds a 35 mm film strip 200a containing six frames of images, and the film holder 201b holds a "brownie" type film strip 200b containing three frames of images. The film holders 201a and 201b have the same width and thickness so that either of them can be held by the rail member 105. Further, the length of the film holders 201a and 201b is substantially the same as the length of the table 101. On the film holder 201a, a slit 202a to which the film strip 200a is to be inserted extends through in the length (longitudinal) direction thereof. Similarly, a slit 202b, to which the film strip 200b is to be inserted, extends through in the longitudinal direction of the film holder 201b.

On the film holder 201a, six frame windows 203a corresponding to the six images of the film strip 200a are formed, and, on the film holder 201b, three frame windows 203b corresponding to the three images of the film strip 203b are formed.

At the leading end portions of the film holders 201a and 201b, the film identifying openings 204a and 204b are formed, respectively. The film identifying openings 204a and 204b are used for identifying a folder (film strip) currently inserted, and therefore, the openings 204a and 204b are different. In an example shown in FIG. 1, the openings 204a and 204b have the same size in the longitudinal direction of the film holder, but have different numbers and size in the width direction thereof. In FIG. 1, the openings 204a consist of four openings having a relatively small width, and the openings 204b consist of two openings having a relatively wide width. It should be noted that the pattern (the number, size and combination thereof) can be determined arbitrarily so that individual film holders can be identified. Since various kind of patterns can be employed, the number of film holders is not limited to two, but can be more than two. Furthermore, the film identifying openings may be used for representing a binary code having a predetermined number of bits. Furthermore, the openings 204a and 204b may be substituted with a pattern having opaque and transparent portions. In this case, the transparent portions may be formed as colored transparent portions for carrying more information.

Next to the film identifying openings 204a and 204b, on a rear side thereof, shading correction windows 205a and 205b are formed, respectively. The shading correction windows 205a and 205b are used for correcting the shading characteristics. It should be noted that no part of the film strips 200a and 200b to be scanned is located within the shading correction windows 205a and 205b.

Figure 2:
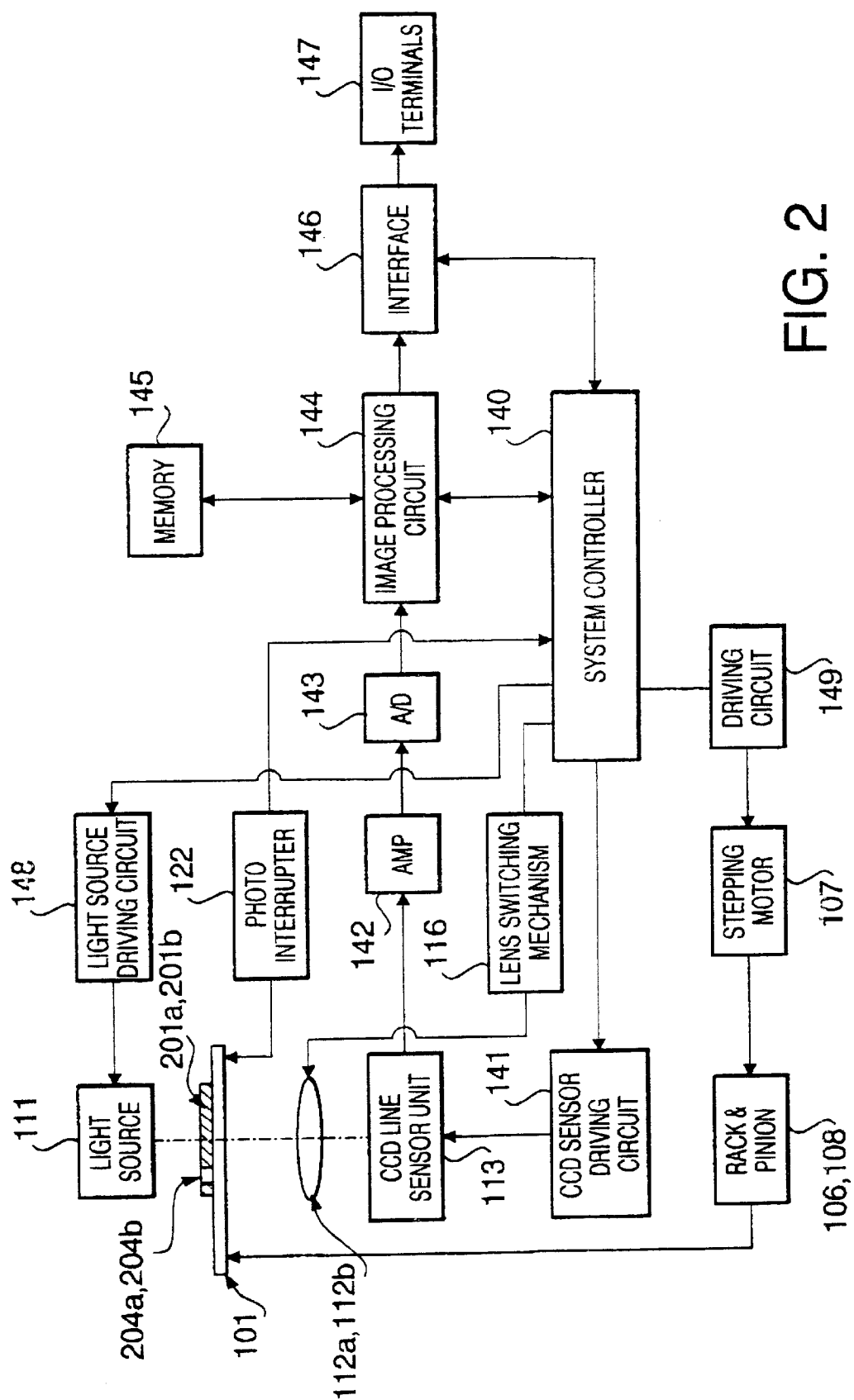
FIG. 2 is a block diagram of the film scanner according to the first embodiment of the invention.

FIG. 2 is a block diagram of the film scanner according to the first embodiment of the present invention.

The CCD line sensor unit 113 is driven by a line sensor driving circuit 141. The image signal output by the CCD line sensor unit 113 is amplified by the amplifier 142, and converted into a digital image signal by the A/D converter 143. Then, image processing operations are applied to the digital image signal, by the image processing circuit 144, to generate a required image signal.

A memory 145 is, for example, an IC card, and is used for storing the processed image as image data. The output of the image processing circuit 144 is also transmitted, via an interface circuit 146 (e.g., SCSI or USB), to I/O terminals 147, which may be connected to an external device such as a personal computer.

The light source 111 is driven by a light source driving circuit 148 which is controlled by the system controller 140. The motor 107 is driven by a motor driving circuit 149 which is also controlled by the system controller 140. The output of the photo interrupter 122 is input to the system controller 140.

Figure 3:
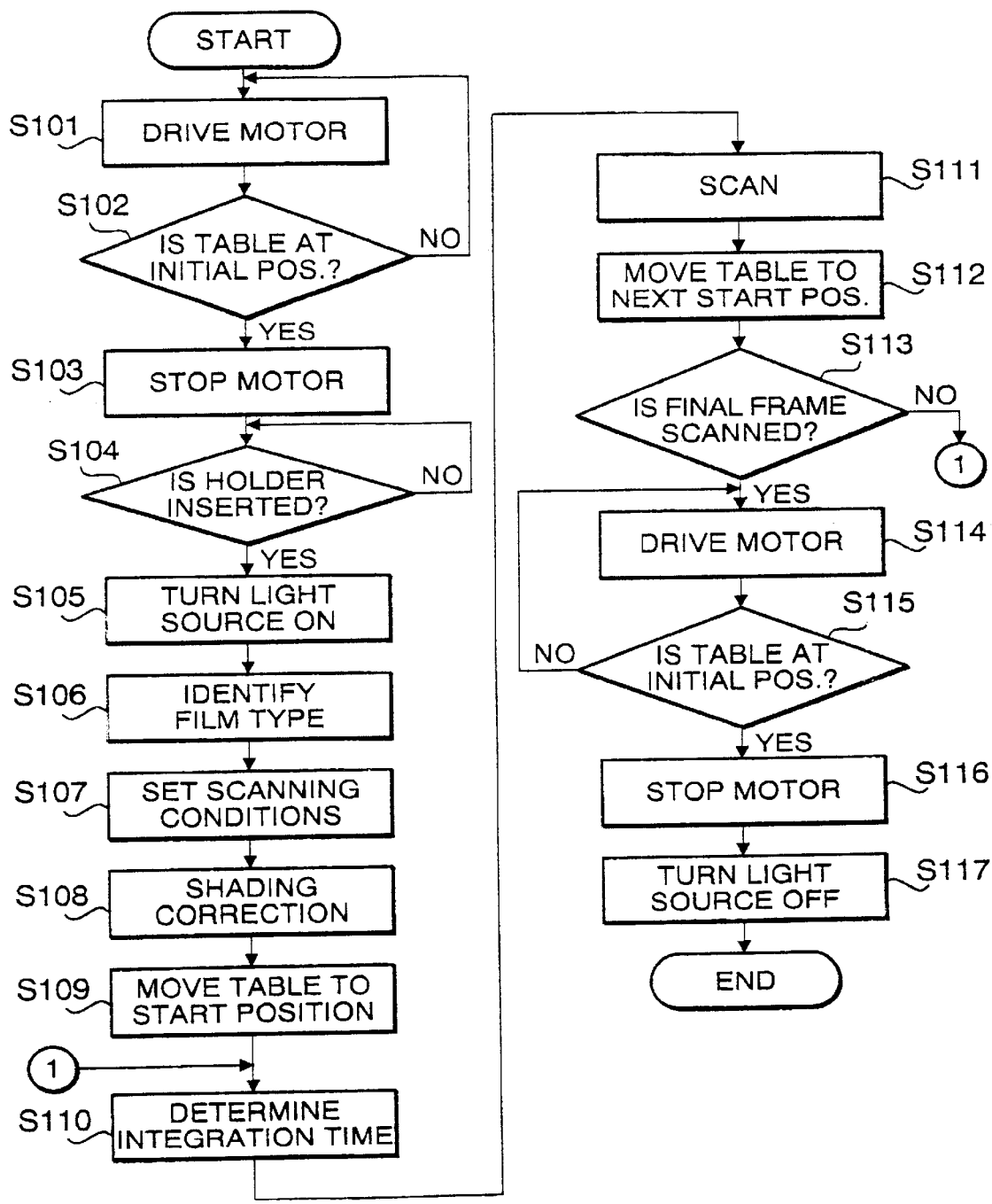
FIG. 3 is a flowchart illustrating an operation of the film scanner according to the first embodiment.

FIG. 3 is a flowchart illustrating a scanning operation of the film scanner according to the first embodiment of the invention.

The procedure shown in FIG. 3 is started, for example, when a power switch (not shown) of the film scanner is turned ON. It should be noted that, when the procedure shown in FIG. 3 is started, the table 101 is located at a position where the leading edge of the table 101 is located away from the scanning section 110 (on the rear side of the scanning section 110).

In S101, the system controller 140 controls the motor driving circuit 149 to start driving the motor 107. In S102, it is determined whether the table 101 is located at an initial position. The initial position is defined as a position at which the film identifying openings 204a or 204b are located at the scanning section 110. If the table 101 has not yet reached the scanning section 110 (S102: NO), the motor 107 is kept driven (S101). If the table has reached the initial position (S102: YES), control proceeds to S103 where the motor 107 is stopped.

In order to scan the 35 mm film strip 200a, it is inserted in the slit 202a of the film holder 201a, and the position of the film strip 200a is adjusted such that the frame images are located on the frame windows 203a, respectively. Then, the film holder 201a is inserted in the rail member 105, and locate the six frame windows 203a at the window 103.

When the system controller 140 detects the insertion of the film holder 201a on the table 101 (S104: YES), the system controller 140 controls the light source driving circuit 148 to turn ON the light source 111 (S105). The light emitted by the light source 111 passes through the film identifying openings 204a and is received by the CCD line sensor unit 113. At this stage, it is preferable that the lens 112b for the "brownie" type film be inserted between the film identifying openings 204a and the CCD line sensor unit 113. Then, the system controller 140 identifies the film holder currently inserted, or the kind of film to be scanned based on the output of the CCD line sensor unit 113 (S106). In accordance with the detected film holder or the detected film type, scanning conditions are set (S107). That is, the suitable imaging lens is located at the scanning section 110, a length of the auxiliary scanning for one frame and other scanning parameters are set. If the film holder 201a is inserted, the rotary solenoid 115 is driven so that the imaging lens 112a is located at the scanning section 110.

In S108, the motor 107 is driven so that the shading correction window 205a is located at the scanning section 110, and based on the output of the CCD line sensor unit 113, which receives the light passed through the shading correction window 205a, the shading correction data is generated.

Next, the motor 107 is further driven to locate a scanning start position where the leading edge of the first frame window 203a is located at the scanning section 110 (S109). At this position, by receiving the amount of light passed through the film strip 200a, an integration period of the CCD sensor unit 113 is determined (S110).

Then, the scanning operation for scanning a frame of image is executed at S111. It should be noted that, the imaging lens and the moving amount of the table 101 for scanning a frame of image are determined based on the identification made at S106.

After one frame of image has been scanned, control proceeds to S112 in which the table 101 is moved until the leading edge of the next frame is located at the scanning section 110 (S112). Then, it is determined whether the last frame has been scanned (S113). If the last frame has not been scanned (S113: NO), steps S110 through 112 are repeated to execute the scanning operation successively. If the last frame has been scanned (S113; YES), control proceeds to S114 where the motor 107 is reversely driven until the table 101 is located at the initial position (S115). When the table 101 has reached the initial position (S115: YES), the motor 107 is stopped (S116) and the light source 111 is turned OFF (S117).

When the "brownie" type film strip 200b is to be scanned, the similar procedure is executed. In this case, the lens 112b is located at the scanning section and scanning parameters for the "brownie" type film are set in S107.

According to the first embodiment, since the kind (size) of the film to be scanned is automatically recognized and the scanning conditions are automatically set according to the recognized film type, even if the films are exchanged frequently, the user need not set the scanning conditions manually. Further, since the film to be scanned is identified by use of the CCD line sensor unit 113 which is used for the scanning, no additional devices are required in the scanner.

Figure 4:
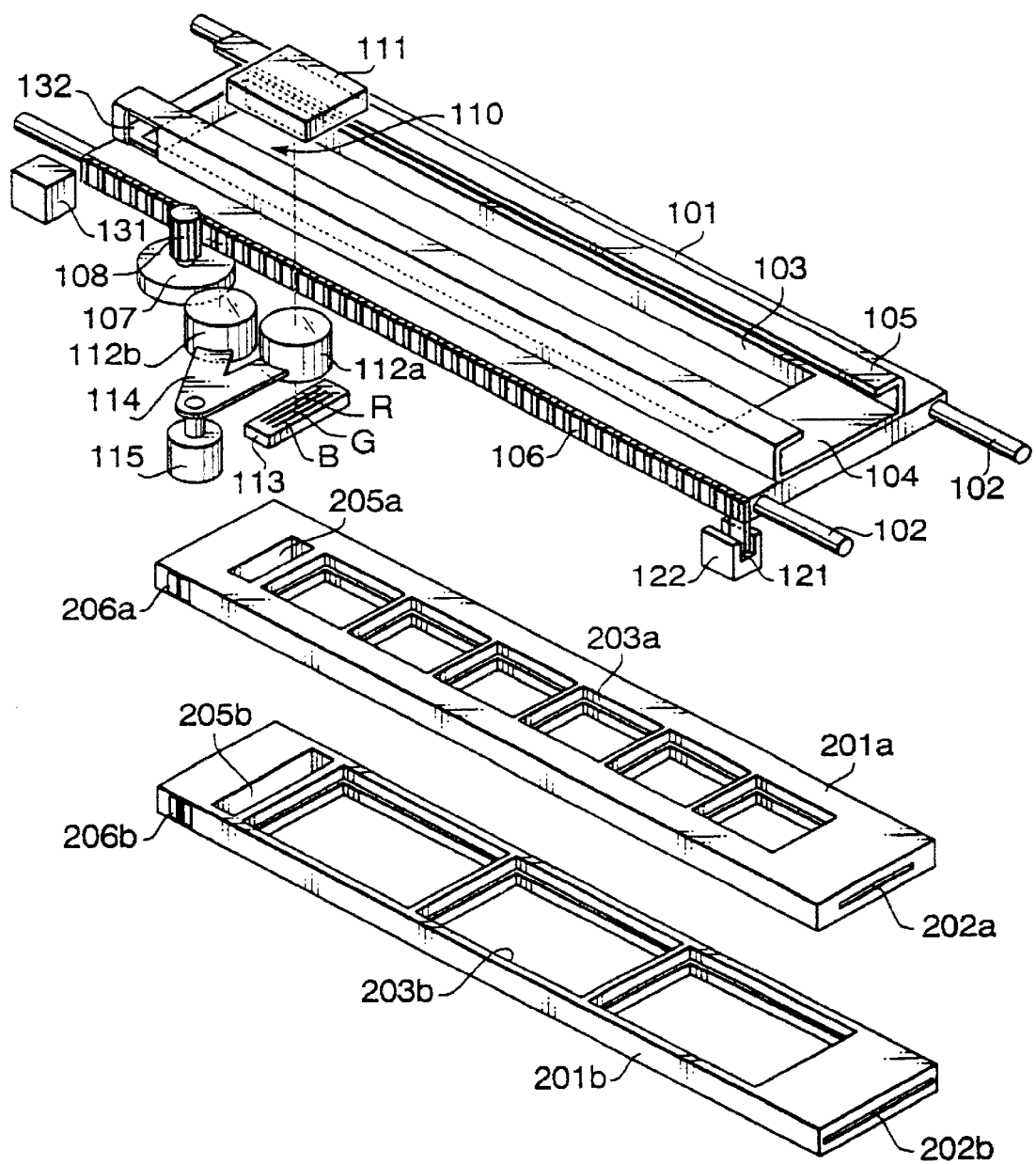
FIG. 4 is a partially exploded perspective view of a part of a film scanner according to a second embodiment of the invention.

FIG. 4 is a partially exploded perspective view of a part of a film scanner according to a second embodiment of the invention.

Structurally, the second invention is substantially the same as the first embodiment except that, in the second embodiment, the film identifying openings 204a and 204b are omitted, and instead, a bar code sensor 131 for reading bar codes respectively provided on a side surface of the film holders 201a and 201b is provided. Further, in the second embodiment, for allowing the bar code sensor 131 to read the bar code, an opening 132 is formed on a rail member 104.

As shown in FIG. 4, at the leading end portions of the side surfaces of the film holders 201a and 201b, the bar codes 206a and 206b are formed. The bar codes 206a and 206b may be formed by directly printing on the side surfaces of the film holders 201a and 201b, or applying stickers on which the bar codes are printed. The bar code sensor 131 may be a reflection type photo sensor which emits light toward the bar code and receives the reflected light to detect the bar code pattern.

Figure 5:
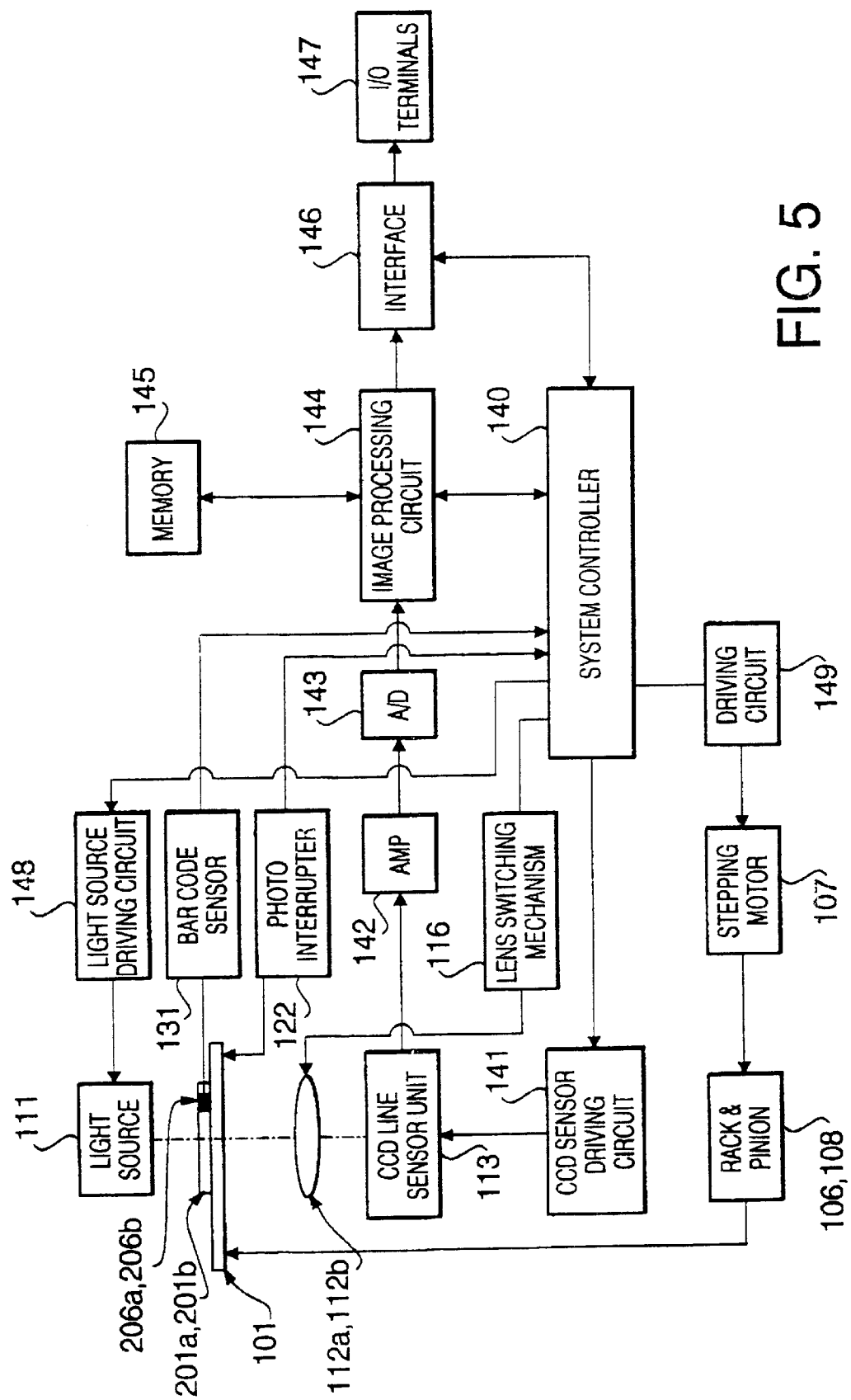
FIG. 5 is a block diagram of the film scanner according to the second embodiment of the invention.

FIG. 5 is a block diagram of the film scanner according to the second embodiment. The configuration is substantially the same as that of the first embodiment except that, as described above, the bar code sensor 131 is provided to detect the bar codes 206a and 206b. The detected bar code is input to the system controller 140 to identify the film strip to be scanned.

In the first embodiment, in S106 of the flowchart shown in FIG. 3, the film identifying openings 204a and 204b are read to identify the film to be scanned. In the second embodiment, the film is identified based on the bar codes 206a and 206b in S106. In this connection, according to the second embodiment, the initial position of the table 101 is to be defined as a position where the bar code 206a or 206b faces the window 132 and is read by the bar code reader 131.

In the above embodiments, a plurality of imaging lenses are provided and switched in accordance with the film strip to be scanned. However, the invention is not limited to such a configuration. That is, for example, a single zoom lens may be located at the scanning section 110 and the focal length of the zoom lens may be changed in accordance with the identified film.

In the second embodiment, to identify the film to be scanned, a bar code and a bar code sensor are employed. However, the invention is not limited to the detection system as described, and a various type of detection systems may be used. For example, a magnetic information carrier such as a magnetic tape and its detector, a mechanical detection system, or an electrical detection system may be used.

In the embodiments, only the 35 mm film strip 200a and the "brownie" type film strip 200b are subjected to scanning. However, any other kind of film (e.g., an 8 mm film, 16 mm film, a sheet film whose size is 6.5 cm×9 cm, 9cm×12 cm, 10 cm×12.5 cm, 13 cm×18 cm, 18 cm×24 cm or 20cm×25 cm) can be alternatively or optionally subjected to scanning by using an appropriate film holder.

In the embodiments, only the different size of films are identified and scanned. However, the invention is not limited to the described embodiments. For example, it is possible to identify not only the size of the film (e.g., 35 mm film, "brownie" type film, etc.) but also identify the kind of film (e.g., infrared film, X-ray film, etc.). In the latter case, the image processing operation may be changed in accordance with the identified film type.

The present disclosure relates to the subject matter contained in Japanese Patent Application No. HEI 11-119277, filed on Apr. 27, 1999, which is expressly incorporated herein by reference in its entirety.

What is claimed is:

1. A film scanner for scanning images formed on a film, the film scanner comprising:
   a film type identifier that automatically identifies a type of a film to be scanned;
   a scanning condition setter that automatically sets a scanning condition in accordance with the type of the film identified by said film type identifier; and
   a plurality of imaging lenses, the scanning condition setter selecting one of the plurality of imaging lenses that corresponds to the type of film.

2. The film scanner according to claim 1, wherein said film type identifier identifies the type of film based on a size of the film.

3. The film scanner according to claim 1, wherein said film type identifier identifies the type of film based on gamma characteristics.

4. The film scanner according to claim 3, wherein the scanning condition includes a condition of an image processing operation.

5. The film scanner according to claim 1, further comprising:
   a line image sensor that scans the film in a main scanning direction; and
   an auxiliary scanner that moves the film relative to said line image sensor in an auxiliary scanning direction perpendicular to the main scanning direction.

6. The film scanner according to claim 5, wherein said film type identifier identifies a size of the film, and wherein said scanning condition setter sets a focal length of the selected imaging lens that forms an image of the film on said line image sensor.

7. The film scanner according to claim 1, wherein said film type identifier identifies the type of film based on a film holder holding the film, different types of films being held by different film holders.

8. The film scanner according to claim 7, wherein said film type identifier optically identifies the film holder.

9. The film scanner according to claim 8, wherein said film type identifier comprises:
   a detector that detects a unique pattern formed by a plurality of openings in the film holder, different film holders having different unique patterns, respectively.

10. The film scanner according to claim 8, wherein said film type identifier comprises:
    a code detector that detects a code indicated by a code indicator on the film holder, the code indicator indicating the type of film.

11. The film scanner according to claim 10, wherein said code indicator carries a bar code.

12. The film scanner according to claim 1, wherein said scanning condition setter comprises a switcher that switches to the selected imaging lens that corresponds to the type of film.

13. A film scanner for scanning images formed on a film, the film scanner comprising:
    a film type identifier that automatically identifies a type of a film to be scanned based on a size of the film, the film type identifier being configured to identify at least 8 mm film, 16 mm film, 35 mm film and "brownie" film; and
    a scanning condition setter that automatically sets a scanning condition in accordance with the type of the film identified by said film type identifier.

14. A film scanner for scanning images formed on a film, the film scanner comprising:
    a film type identifier that automatically identifies a type of a film to be scanned, the film type identifier being configured to identify at least negative film, positive film, infrared film and X-ray film; and
    a scanning condition setter that automatically sets a scanning condition in accordance with the type of the film identified by said film type identifier.

15. The film scanner according to claim 14, wherein the scanning condition includes a condition of an image processing operation.

16. A film scanner for scanning images formed on a film, the film scanner comprising:
    a film type identifier that automatically identifies a type of a film to be scanned;
    a scanning condition setter that automatically sets a scanning condition in accordance with the type of the film, said scanning condition setter comprising a switcher that switches to one of a plurality of imaging lenses that corresponds to the type of film;
    a line image sensor unit that scans the film in a first direction; and
    an auxiliary scanning system that moves the film relative to the line image sensor in a second direction, perpendicular to the first direction;
    wherein said scanning condition setter sets a focal length of the one imaging lens, which forms an image of the film on said line image sensor.

17. The film scanner according to claim 16, wherein said scanning condition setter sets a moving amount of the film, relative to said line image sensor, for scanning each frame of the image in accordance with a size of the film to be scanned.

18. A film scanner for scanning images formed on a film, the film scanner comprising:
    a film type identifier that automatically identifies a type of a film to be scanned;
    a scanning condition setter that automatically sets a scanning condition in accordance with the type of the film;
    a line image sensor unit that scans the film in a first direction; and
    an auxiliary scanning system that moves the film relative to the line image sensor in a second direction, perpendicular to the first direction;
    wherein said scanning condition setter sets a focal length of an imaging lens, which forms an image of the film on said line image sensor, and sets a moving amount of the film, relative to said line image sensor, for scanning each frame of the image in accordance with a size of the film.

19. The film scanner according to claim 18, wherein said scanning condition setter comprises a switcher that switches among a plurality of imaging lenses, the switcher switching to the imaging lens based on the type of film.

20. A film scanner for scanning images formed on a film, the film scanner comprising:
    a film type identifier that automatically identifies a type of a film to be scanned based on optically identifying a film holder that holds the film, different types of films being held by different film holders, the film type identifier comprising a detector that detects a unique pattern formed by a plurality of openings in the film holder, the different film holders having different patterns; and
    a scanning condition setter that automatically sets a scanning condition in accordance with the type of the film identified by said film type identifier;
    wherein the detector comprises an image sensor that scans the film.

* * * * *